(12) United States Patent
Schmidl et al.

(10) Patent No.: US 7,372,825 B1
(45) Date of Patent: May 13, 2008

(54) WIRELESS COMMUNICATIONS SYSTEM WITH CYCLING OF UNIQUE CELL BIT SEQUENCES IN STATION COMMUNICATIONS

(75) Inventors: Timothy M. Schmidl, Dallas, TX (US); Alan Gatherer, Richardson, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1704 days.

(21) Appl. No.: 09/605,610

(22) Filed: Jun. 28, 2000

Related U.S. Application Data

(60) Provisional application No. 60/143,574, filed on Jul. 13, 1999.

(51) Int. Cl.
*H04Q 7/00* (2006.01)
(52) U.S. Cl. .................................................. 370/328
(58) Field of Classification Search ................ 370/210, 370/315, 319, 320, 328, 332, 335, 342, 394, 370/441
See application file for complete search history.

(56) References Cited

U.S. PATENT DOCUMENTS

| | | | | |
|---|---|---|---|---|
| 5,479,444 A | * | 12/1995 | Malkamaki et al. | 370/337 |
| 5,995,499 A | * | 11/1999 | Hottinen et al. | 370/337 |
| 6,044,111 A | * | 3/2000 | Meyer et al. | 375/231 |
| 6,144,710 A | * | 11/2000 | Chen et al. | 370/337 |
| 6,275,506 B1 | * | 8/2001 | Fazel et al. | 370/478 |
| 6,339,612 B1 | * | 1/2002 | Stewart et al. | 370/342 |
| 6,584,150 B1 | * | 6/2003 | Wu et al. | 375/231 |
| 6,606,314 B1 | * | 8/2003 | Bahrenburg et al. | 370/347 |
| 6,690,658 B1 | * | 2/2004 | Klank | 370/324 |
| 6,775,260 B1 | * | 8/2004 | Dabak et al. | 370/342 |
| 6,816,507 B1 | * | 11/2004 | Jarbot et al. | 370/465 |
| 6,917,597 B1 | * | 7/2005 | Schmidl et al. | 370/280 |
| 2003/0219080 A1 | * | 11/2003 | Alamouti et al. | 375/299 |
| 2004/0101032 A1 | * | 5/2004 | Dabak et al. | 375/143 |
| 2004/0190603 A1 | * | 9/2004 | Dabak et al. | 375/148 |

FOREIGN PATENT DOCUMENTS

| | | |
|---|---|---|
| EP | 0 535 403 A | 4/1993 |
| EP | 0 767 557 A | 4/1997 |
| WO | WO 98 07291 A | 2/1998 |
| WO | WO 99 67916 A | 12/1999 |

* cited by examiner

*Primary Examiner*—Anh-Vu H. Ly
(74) *Attorney, Agent, or Firm*—Ronald O. Neerings; Wade James Brady, III; Frederick J. Telecky, Jr.

(57) ABSTRACT

A wireless communication system (10). The system comprises transmitter circuitry (BST1) comprising circuitry for transmitting a plurality of frames to a receiver in a first cell (Cell 1). Each of the plurality of frames comprises a bit group (22), and the bit group uniquely distinguishes the first cell from a second cell (Cell 2) adjacent the first cell. The transmitter circuitry further comprises circuitry (54) for inserting a bit sequence into the bit group. The bit sequence is selected from a plurality of bit sequences ($S_1$-$S_K$) such that successive transmissions by the transmitter circuitry comprise a cycle of successive ones of the plurality of bit sequences.

13 Claims, 5 Drawing Sheets

WIRELESS COMMUNICATIONS SYSTEM WITH CYCLING OF UNIQUE CELL BIT SEQUENCES IN STATION COMMUNICATIONS

CROSS-REFERENCES TO RELATED APPLICATIONS

This application claims the benefit, under 35 U.S.C. §119(e)(1), of U.S. Provisional Application No. 60/143,574, filed Jul. 13, 1999, and incorporated herein by this reference.

STATEMENT REGARDING FEDERALLY SPONSORED RESEARCH OR DEVELOPMENT

Not Applicable.

BACKGROUND OF THE INVENTION

The present embodiments relate to wireless communications systems and are more particularly directed to distinguishing actual cell bit sequences from likely false cell bit sequences.

Wireless communications have become very prevalent in business, personal, and other applications, and as a result the technology for such communications continues to advance in various areas. One such advancement includes the use of spread spectrum communications, including that of code division multiple access ("CDMA"). In such communications, a user station (e.g., a hand held cellular phone) communicates with a base station, where typically the base station corresponds to a "cell." More particularly, CDMA systems are characterized by simultaneous transmission of different data signals over a common channel by assigning each signal a unique code. This unique code is matched with a code of a selected user station within the cell to determine the proper recipient of a data signal.

CDMA continues to advance along with corresponding standards that have brought forth a next generation wideband CDMA ("WCDMA"). WCDMA includes alternative methods of data transfer, one being frequency division duplex ("FDD") and another being time division duplex ("TDD"). The present embodiments have particular benefit in TDD and, thus, it is further introduced here. TDD data are transmitted as quadrature phase shift keyed ("QPSK") symbols in data packets of a predetermined duration or time slot. Within a data frame having 15 of these slots, bi-directional communications are permitted, that is, one or more of the slots may correspond to communications from a base station to a user station while other slots in the same frame may correspond to communications from a user station to a base station.

Each TDD data packet includes a predetermined training sequence in the time slot, referred to in the art as a midamble, where this training sequence represents a known data pattern used for channel estimation. Specifically, the midamble includes information that is unique to a given cell and is selected from a pre-defined set of 128 different possible bit sequences; thus, the unique sequence is assigned to the given cell and that information is encoded within the midamble of data frames transmitted by stations within the corresponding cell. Conversely, data packets exchanged with respect to an adjacent cell have midambles with a different one of the bit sequence sets encoded therein and corresponding to the adjacent cell. Lastly, note that a base station in some instances may communicate with different cells (i.e., is "sectorized"); in this case, then a different and unique midamble is encoded within the data frames communicated with respect to that base station for each of the different cells. For the sake of simplicity in the remainder of this document, each base station is associated only with a single cell and, thus, in this respect, the cell's unique midamble also may be viewed as unique per the corresponding base station. In any event, the basic midamble code may be one of two lengths, where currently these lengths are described as a long basic midamble code with 456 bits and a short basic midamble code with 192 bits. While a basic midamble code consists of the same bit sequence used for communications between a base station and all user stations in the cell corresponding to that base station, each user station in the cell is distinguishable from the others because it is assigned a different time-shifted version of the basic midamble code. The assigned shifting is defined in terms of an offset in the basic midamble code, that is, each user station within the cell is assigned its own offset that represents the amount of time shift adjustment for the user station's basic midamble code. For example, with a short length midamble code thereby having a length of 192 bits, and with eight user stations communicating with one base station, the offsets for each of the eight user stations may be spaced 24 chips apart. Thus, the same basic sequence is used for all of these user stations except that for each user station it is circularly shifted by a different multiple of 24 chips to correspond to the offset of the particular user station. After the circularly-shifted basic sequences are summed, a cyclic prefix is inserted to form a midamble of length 256 chips for a short basic midamble code and of length 512 chips for a long basic midamble code.

Two related aspects arise in connection with midambles, as explained here according to the prior art and as further addressed later in connection with the preferred embodiments. The first aspect is channel estimation and the second aspect is delay profile estimation ("DPE"). Looking first to channel estimation, in the prior art signal paths are received by a receiver at different times, referred to as different chip positions. In response to each of these paths falling within a defined time period referred to as a channel estimation window, and more particularly in response to the midamble in each path in the channel estimation window, the receiver computes a corresponding channel estimate for each path. The channel estimates may be computed using a Fourier transform applied to the entire composite signal that exists in the channel estimation window, where the composite signal is therefore a function of the midambles of any paths occurring within the window. The result of the Fourier transform presents channel estimates at each of the chip positions within the window, and the computed channel estimates are stored with references to the chip position for each estimate. Given the channel estimates, the receiver also performs DPE by noncoherently averaging channel estimates derived from the midambles over many frames, which generally therefore sums the respective absolute channel estimate values for each bit position within the channel estimation window. The DPE therefore represents the average power at each bit position over many frames, thereby attempting to average over the fades and the noise. In response to the DPE, the channel estimates corresponding to those bit positions having an average power greater than some threshold are further used by the receiver for additional signal processing, such as for developing channel estimates using a maximal ratio combining ("MRC") process.

To further appreciate the context of the preferred embodiments, an additional introduction is made with respect to receipt by a receiver of both actual paths and false paths. Specifically, recall that a midamble used in one cell is different from the midamble used in an adjacent cell. Nonetheless, a receiver may often receive paths from both a station in the cell in which the receiver is located and also paths from other stations in one or more adjacent cells. Thus, in each of the received paths, there is included either a midamble for the cell in which the receiver is located or a midamble from a different cell. Ideally, when the receiver is attempting to communicate only with other stations in the cell in which the receiver is located, then to properly determine its channel estimates it should make that determination only in response to the paths (and their corresponding midambles) from those other stations in the cell in which the receiver is located; thus, these paths are referred to as actual paths. Also in the ideal case, the receiver should disregard those paths received from transmitters of other cells, and those paths are referred to as false paths in that they represent information to the receiver that is not from the cell with which the receiver is attempting to communicate.

While the preceding aspects of channel estimates and DPE have provided a certain level of receiver performance in the prior art, it has been determined in connection with the present inventive embodiments that such operations may be improved, thereby also increasing the performance of additional operations (e.g., MRC) that rely upon these preceding operations. Specifically, it now may be noted that by identifying the paths having a relatively high average power, the DPE is in effect attempting to identify only the actual paths received, while thereby assuming that the paths having a relatively low average power are false paths. However, the present inventors have recognized that while the DPE process will eliminate some false paths which occur due to noise or fading, the DPE process may not eliminate a considerable number of other false paths. Further, this failure of the DPE has been observed to arise due to the high cross-correlation between the different midamble sequences. In other words, for the 128 different possible sequences (of either 192 or 456 bits), there is a considerable cross-correlation between various pairs of these sequences. This cross-correlation will therefore cause false paths to appear, and it is not accommodated by the prior art DPE process. As a result, in the prior art some of these false paths are accepted as actual paths by the DPE process and, thus, the channel estimates corresponding to these false paths are then used for further processing by the receiver, where such uses thereby deplete resources that are better served for processing actual paths. Again by way of example, the channel estimates corresponding to these false paths may be assigned to different fingers in a rake receiver performing MRC analysis, where those fingers would be better suited for assignment to actual path channel estimates. Thus, in the prior art there is a considerable chance for communications from adjacent cells to diminish the ability of a user station to perform its channel estimation.

In view of the preceding, there is a need to improve the DPE in response to actual and false midamble basic sequences, and this need is addressed by the preferred embodiments as described below.

BRIEF SUMMARY OF THE INVENTION

In the preferred embodiment, there is a wireless communication system. The system comprises transmitter circuitry comprising circuitry for transmitting a plurality of frames to a receiver in a first cell. Each of the plurality of frames comprises a bit group, and the bit group uniquely distinguishes the first cell from a second cell adjacent the first cell. The transmitter circuitry further comprises circuitry for inserting a bit sequence into the bit group. The bit sequence is selected from a plurality of bit sequences such that successive transmissions by the transmitter circuitry comprise a cycle of successive ones of the plurality of bit sequences. Other circuits, systems, and methods are also disclosed and claimed.

DETAILED DESCRIPTION OF THE INVENTION

Figure 1:
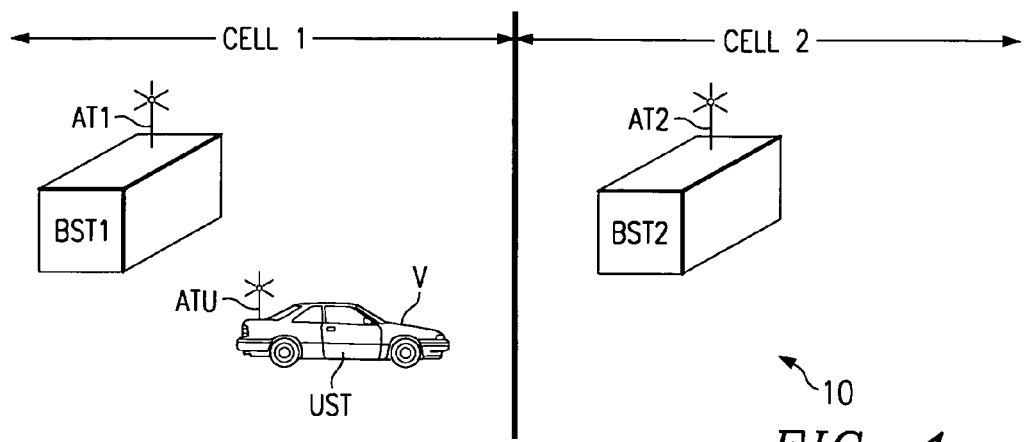
FIG. 1 illustrates a diagram of a cellular communications system by way of a contemporary code division multiple access ("CDMA") example in which the preferred embodiments may be implemented.

FIG. 1 illustrates a diagram of a cellular communications system 10 by way of a contemporary code division multiple access ("CDMA") or wideband CDMA ("WCDMA") example in which the preferred embodiments may be implemented. Within system 10 are shown two base stations BST1 and BST2. Each base station BST1 and BST2 includes a respective antenna AT1 and AT2 from which the station may transmit or receive CDMA signals. The general area of intended reach of each base station defines a corresponding cell; thus, base station BST1 is intended generally to communicate with cellular devices within Cell 1 while base station BST2 is intended generally to communicate with cellular devices within Cell 2. Of course, some overlap between the communication reach of Cells 1 and 2 exists by design to support continuous communications should a communication station move from one cell to the other. Indeed, further in this regard, system 10 also includes a user station UST, which is shown in connection with a vehicle V to demonstrate that user station UST is mobile. Thus, vehicle V and its corresponding user station UST may move freely in and between Cell 1 and Cell 2 (or other cells). In addition, by way of example user station UST includes a single antenna ATU for both transmitting and receiving cellular communications.

In some respects, system 10 may operate according to known general techniques for various types of cellular or other spread spectrum communications, including CDMA communications. Such general techniques are known in the art and include the commencement of a call from user station UST and the handling of that call by either or both of base stations BST1 and BST2. Other techniques are ascertainable by one skilled in the art.

One aspect of operation of system 10 which is further enhanced according to the preferred embodiments, and which in various respects is also reflected in the prior art, relates to a technique known as channel estimation. Channel estimation is used by a receiver, where such a receiver could be either in user station UST of base station BST, to estimate the effects that have been imposed on a signal communicated from a transmitter. For example with respect to FIG. 1, since user station UST is located within Cell 1, then as user station UST receives data frames from base station BST1, these frames are said to have arrived along communication channels, and user station UST attempts to determine the effects those channels have on the communication. By estimating these effects, the received signal or later-received signals may be processed in view of the channel estimate in an effort to remove the channel effects, thereby properly recovering the actual data transmitted by base station BST1. In a similar respect, as base station BST1 receives data frames from user station UST, base station BST1 also attempts to determine the channel effects imposed on those data frames. In any event, as introduced in the Background of the Invention section of this document, channel estimation is performed in response to a midamble encoded within each data frame received by a receiver; thus, the notion of frames and midambles, both in connection with the prior art and the preferred embodiments, are further explored below.

Figure 2:
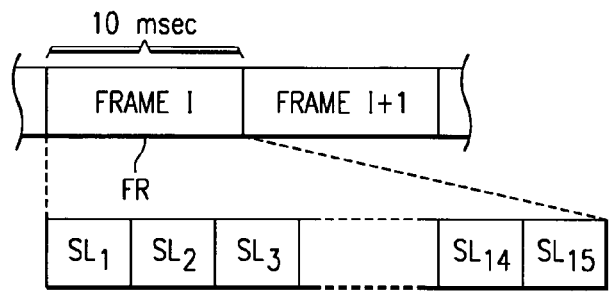
FIG. 2 illustrates a TDD radio frame within which the preferred embodiments may be embedded.

FIG. 2 illustrates a TDD radio frame FR within which the preferred embodiment midambles may be embedded, where the general timing associated with frame FR and its division into portions as described below are known in the art. Frame FR is 10 milliseconds long and is divided into 15 equal duration slots (i.e., therefore, each slot has a duration of 667 microseconds). For the sake of reference, such slots are shown in FIG. 2 as $SL_1$ through $SL_{15}$, and slot $SL_1$ is expanded by way of an example in FIG. 3 to illustrate the following further details.

Figure 3:
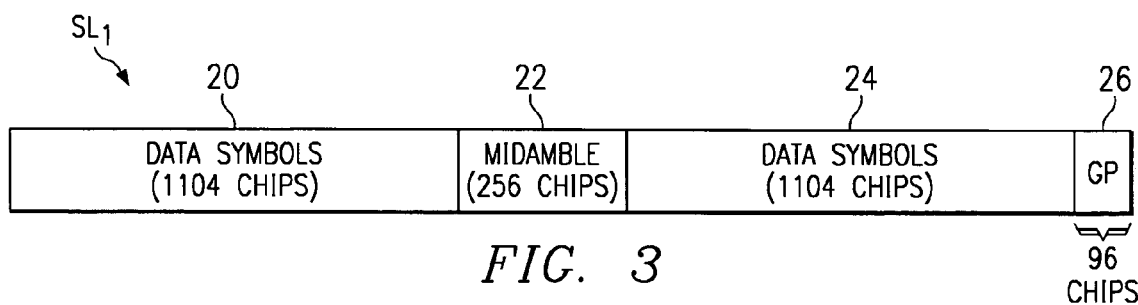
FIG. 3 illustrates a time slot within the radio frame of FIG. 2.

FIG. 3 illustrates the structure of a TDD time slot, where slot $SL_1$ from FIG. 2 is shown by way of example. Generally, each slot, including therefore slot $SL_1$, is divided into what is referred to in the CDMA art as "chips." Specifically, CDMA communications are modulated using a spreading code which consists of a series of binary pulses, and each piece of CDMA signal transmitted according to this code is said to be a "chip." One current CDMA transfer rate is 3.84 Mchips/second and, thus, the 10 millisecond frame FR includes 38,400 chips (i.e., 3.84 Mchips/second*10 milliseconds=38,400). As a result, each of the 15 slots accommodates a total of 2,560 chips (i.e., 38,400 chips/15 slots=2, 560), and each of 160 CDMA symbols within a slot is modulated with 16 chips (i.e., 2,560 chips/slot÷1 slot/160 symbols=16). Looking to the further breakdown of information within a time slot as illustrated by the example of time slot $SL_1$, it includes a first group of data symbols 20 having 1104 chips. First group 20 corresponds to 69 data symbols for an example spreading factor equal to 16.

Following first group 20 in time slot $SL_1$ is a midamble 22 having 16 symbols for the example spreading factor equal to 16. As introduced earlier in the Background Of The Invention section of this document, midamble 22 includes a predetermined training sequence, where this training sequence is used for purposes of channel estimation typically determined using a Fourier transform process. Thus, these midamble symbols are comparable in some respects to pilot symbols used in frequency division duplex ("FDD") systems. Following midamble 22 in time slot $SL_1$ is a second group of data symbols 24, also having 1104 chips. Note that the channel estimate derived from midamble 22 is preferably applied against both the first and second group of data symbols 20 and 24. Finally, second group 26 is followed in time slot $SL_1$ by a guard period 26. Guard period 26 has 96 chips.

Figure 4:
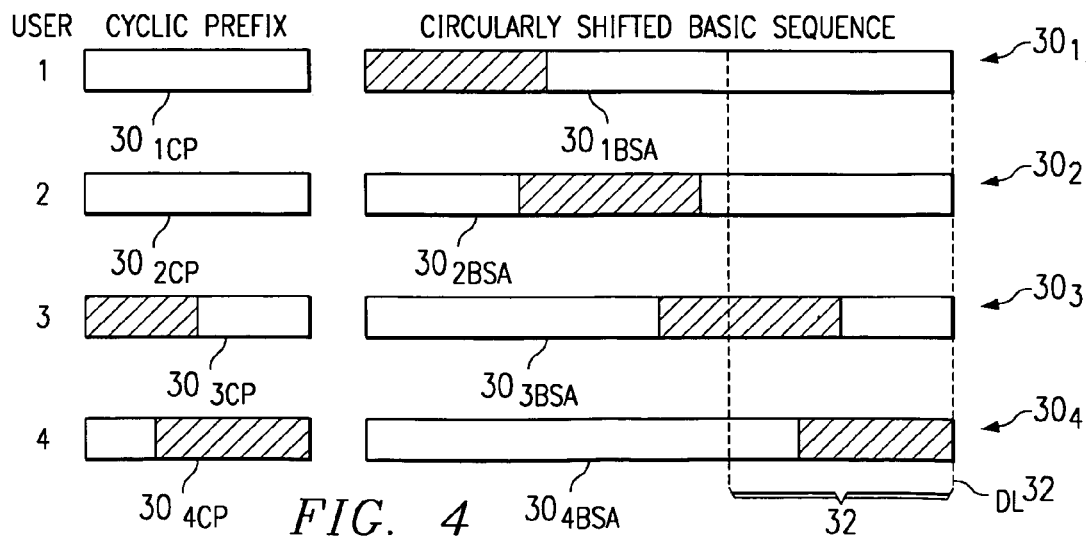
FIG. 4 illustrates a midamble structure for various users in the same cell wherein the basic sequence of the midamble is time shifted for different users.

FIG. 4 illustrates a diagram of an embodiment of the midamble pattern that is used for channel estimation and further demonstrates the use of that pattern for multiple user stations. Specifically, FIG. 4 illustrates four midambles $30_i$ through $30_4$ corresponding to four respective user stations in a single cell, such as for Cell 1 in FIG. 1. Each midamble includes a cyclic prefix where, for sake of reference, each cyclic prefix is identified by adding a "CP" subscript to the midamble identifier (e.g., cycle prefix $30_{1CP}$ for midamble $30_1$). Each midamble also includes a circularly shifted basic sequence area which is identified by adding a "BSA" subscript to the midamble identifier (e.g., basic sequence area $30_{1BSA}$ for midamble $30_1$). A physical gap is shown in FIG. 4 between each cyclic prefix and its basic sequence area only for the sake of illustration, where in fact it should be noted that the information for a given midamble is contiguously presented starting with the cyclic prefix and followed by information in its circularly-shifted basic sequence area. Each of these components of the midamble is further discussed below.

Each circularly shifted basic sequence area includes the cell's unique basic sequence but which is positioned in a shifted manner that is circular with respect to the basic sequence for each other user station in the same cell. To illustrate this aspect, FIG. 4 depicts shading in each basic sequence area to denote the logical beginning of the sequence, where the non-shaded area is intended to illustrate the remainder of the basic sequence. For example with respect to midamble $30_1$, within its basic sequence area $30_{1BSA}$ is its basic sequence with its beginning logically positioned to the left in the area and followed by the remainder of the basic sequence bits; in contrast, midamble $30_2$ includes the same basic sequence within area $30_{2BSA}$, but its shaded portion demonstrates that the beginning of the basic sequence is shifted farther in time to the right relative to basic sequence area $30_{1BSA}$ of midamble $30_1$. The amount of shift of a basic sequence is defined as an offset for each user. In addition, to the extent that the basic sequence within area $30_{2BSA}$ is shifted right, note further that the end of the information of that basic sequence wraps around so that the logical end of the sequence actually appears in time at the beginning of area $30_{2BSA}$. Indeed, this same wraparound effect occurs to an even greater extent for the basic sequence as it is encoded within areas $30_{3BSA}$ and $30_{4BSA}$ because the beginning of the basic sequence in those areas (i.e., shown by shading) is successively shifted farther to the right, thereby leaving a greater portion of the basic sequence to wraparound and, hence, to appear in the left portion of the respective area. Lastly, note that a tail end region 32 is defined generally for all midambles in FIG. 4 as an area to the right of a dashed vertical line $32_{DL}$. Tail end region 32 is depicted to demonstrate that the cyclic prefix for each user station midamble is merely a copy of the pattern of bits within the corresponding tail end region 32 for the midamble. For example with respect to user 3 and its midamble $30_3$, one skilled in the art will readily appreciate that within tail end region 32 for midamble $30_3$ is shown a portion of the beginning of the bit sequence as shown by a shaded portion followed by additional bits of that basic sequence shown by a non-shaded portion, and those two portions are also shown to the same extent within cyclic prefix $30_{3CP}$.

Figure 5:
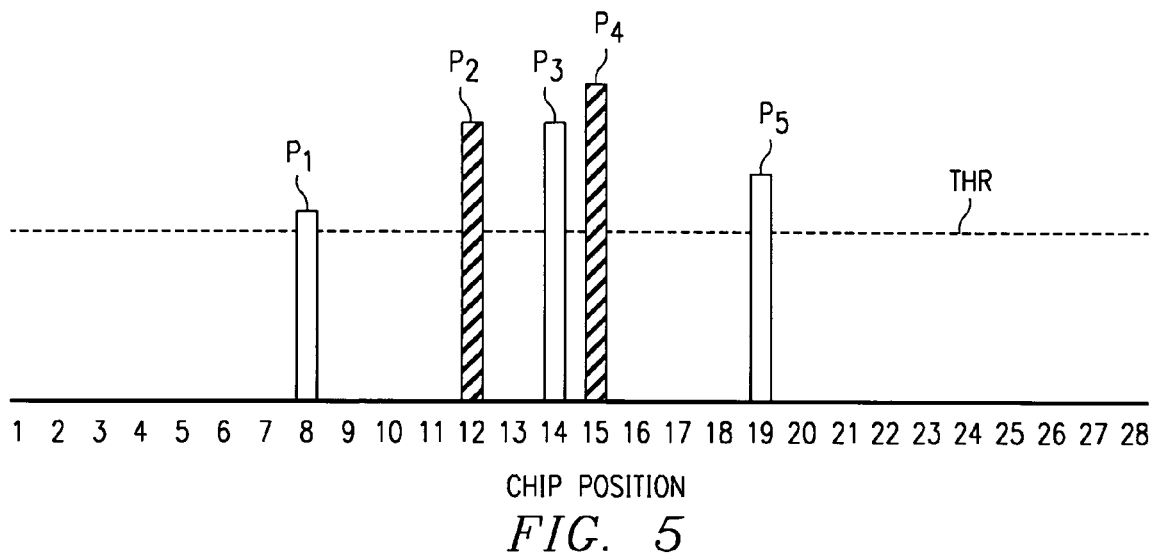
FIG. 5 illustrates a conceptual drawing of a set of paths received by a receiver.

By way of further context for the preferred embodiments, FIG. 5 illustrates a conceptual drawing of a number of paths received by a receiver (e.g., UST), where as an example a total of five paths $P_1$ through $P_5$ are shown and at the chip positions depicted along the horizontal axis. No explicit vertical axis is shown but the relative magnitude of each path is as demonstrated by the relative height of each path in FIG. 5. Further, for sake of discussion a threshold THR is shown with all paths $P_1$ through $P_5$ exceeding threshold THR. Additionally, paths $P_2$ and $P_4$ are shaded to indicate that they are actual paths, meaning those paths are from within the cell in which the receiving user station is located; to the contrary, the remaining paths $P_1$, $P_3$, and $P_5$ are not shaded and, therefore, represent false paths, that is, they represent cross-correlations with midambles from one or more different (e.g., likely adjacent) cells. Of course, the receiver receiving paths $P_1$ through $P_5$ is not, upon receipt of those paths, informed as to which path(s) is actual and which path(s) is false and this inability to distinguish paths raises considerations in connection with the preferred embodiments discussed below.

Figure 6:
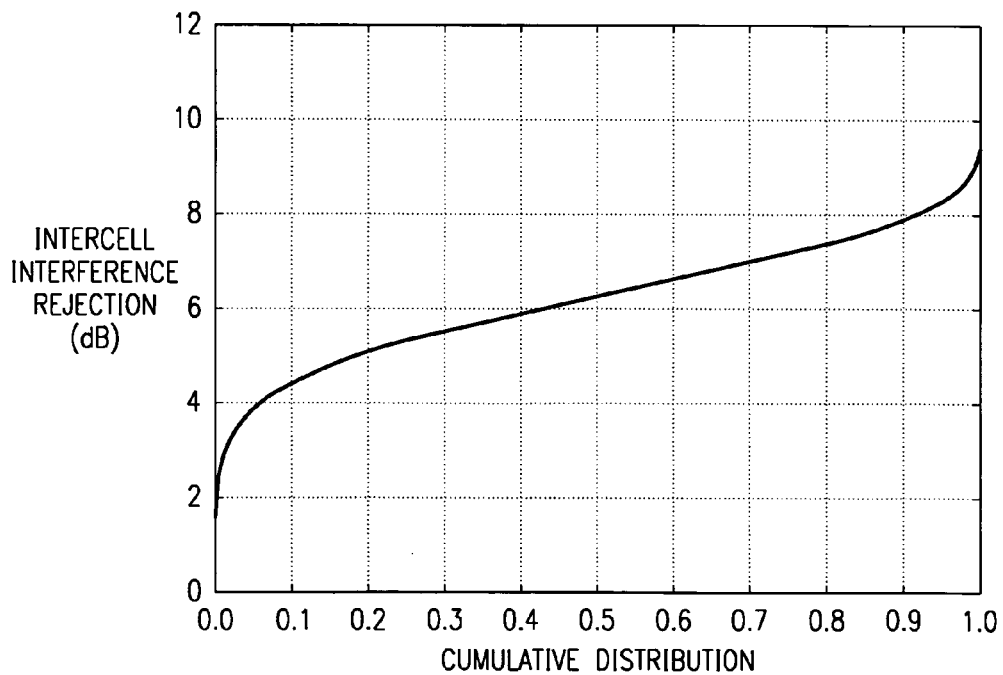
FIG. 6 illustrates a plot of the cumulative distribution of intercell rejection in response to midambles under the prior art.

Given the possibility of a receiver receiving both actual and false paths, both the prior art and the preferred embodiments endeavor to reduce the effects of false paths on the processing and operation of the receiver. In the art, therefore, there is a goal of a receiver to reject the false paths and this concept is sometimes referred to as intercell rejection, that is, the receiver attempts to reject paths from cells other than the cell in which the receiver is located. More particularly as related to the present embodiments, each path represents the receipt of a frame, thereby further including slots and corresponding midambles. In the same respect that generally the receiver attempts to improve intercell rejection, more specifically for the present context the receiver attempts to improve intercell rejection of midambles, that is, to reject false paths along with their corresponding midambles and to thereby exclude the channel estimates from theose midambles from being used in further processing such as maximal ratio combining ("MRC") operations. Further in this regard, FIG. 6 illustrates a plot of an example of the cumulative distribution of intercell rejection under the prior art. Specifically, FIG. 6 illustrates an instance where a receiver (e.g., UST) receives two paths, each having respective midambles of equal power of length 256 and within a channel estimation window of 24 chips, where one of the midambles is assumed to be an actual midamble (e.g., from base station BST1) while the other midamble is assumed to be a false midamble (e.g., from base station BST2). An intercell interference rejection of 6 dB means that the strongest false path caused by cross correlation from an interfering base station is 6 dB lower in power than the strongest path of the actual base station. Thus, if the strongest path from the actual base station has amplitude one (i.e., power of 0 dB), then the strongest false path has amplitude 0.5 (i.e., power of −6 dB).

Given the cumulative distribution of FIG. 6, typically a threshold is used by a receiver in its DPE process in an attempt to distinguish actual paths from false paths, where this threshold may be perceived conceptually as threshold THR in FIG. 5. However, if threshold THR is set to a relatively low value so as to increase the likelihood of including actual paths, then one skilled in the art will appreciate that the relatively large cross correlation from an interfering transmitter also may cause false paths to exceed threshold THR. If this occurs, then the receiver will perform additional operations in response to both the actual and false path midambles that exceed threshold THR, such as in MRC operations discussed earlier; thus, the false paths introduce additional noise into signal processing and decrease the signal-to-noise ratio. Alternatively, threshold THR could be set very high, but this would thereby exclude the weaker actual paths; such an alternative would result in a loss of diversity and a loss in signal power which therefore also would lead to a loss in signal-to-noise ratio performance.

Figure 7:
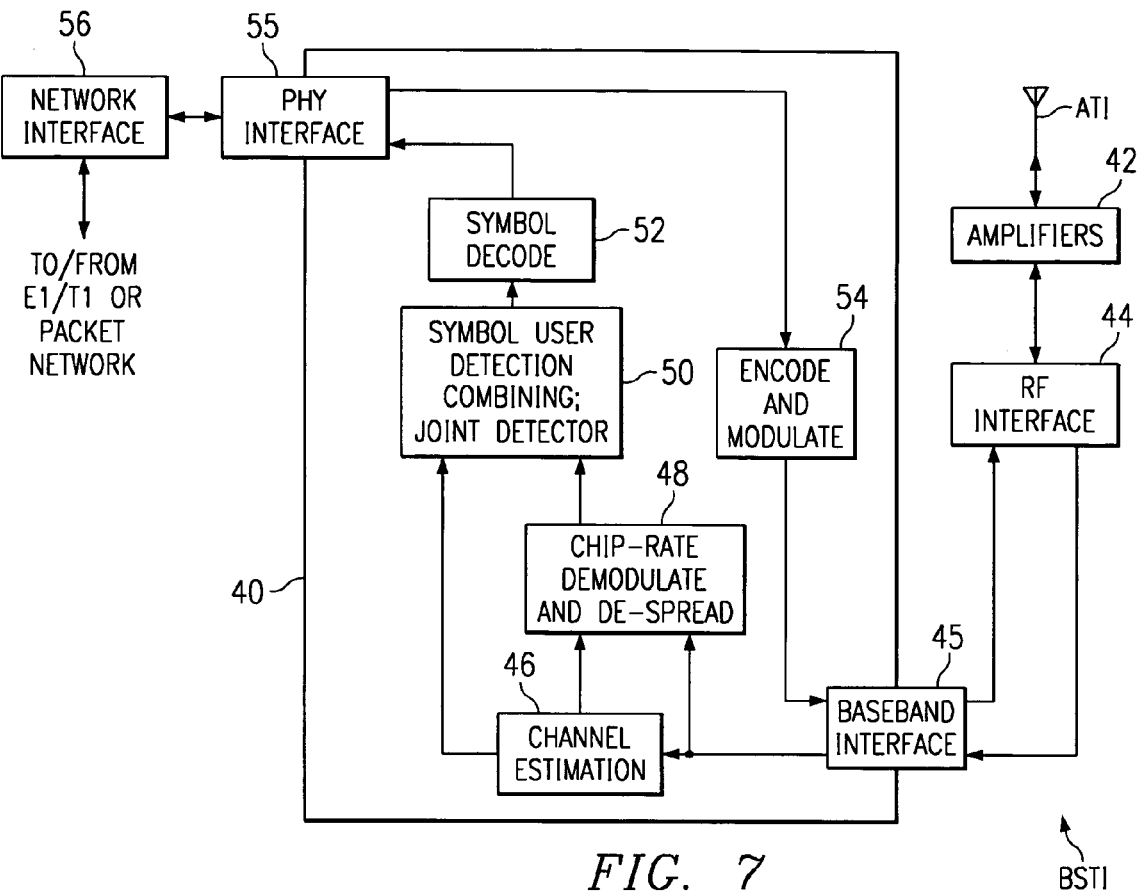
FIG. 7 illustrates a block diagram of the circuitry of a base station as an example of a transmitter/receiver according to the preferred embodiment.

FIG. 7 illustrates a block diagram of base station BST1 (or BST2) by way of an example of the preferred embodiment for a transmitter/receiver, and in which various aspects relating to midamble transmission may be implemented as detailed further below in connection with FIG. 8. Looking generally to FIG. 7, a construction of base station BST1 according to a preferred embodiment is now described. One skilled in the art will appreciate that this particular architecture is provided by way of example only, and that other base station architectures may be used according to the present inventive scope. Additionally, the structure of FIG. 7, as explained in further detail below, is readily modified to present a preferred embodiment transmitter/receiver for use in a user station (e.g., UST) as opposed to a base station.

As shown in FIG. 7, base station BST1 includes amplifiers 42 for driving amplified transmission signals over base station antenna AT1 (or multiple antennas), and for amplifying signals received from antenna AT1. RF interface function 44 includes the appropriate transmit and receive formatting and filtering circuitry. Additionally, RF interface function 44 includes analog-to-digital converters for digitizing the amplified receive signals, and digital-to-analog converters for placing the transmitted signals into the analog domain. As such, RF interface function 44 communicates digitally with baseband interface 45, which provides the appropriate signal formatting between RF interface function 44 and baseband device 40.

Baseband device 40 communicates with the ultimate network, which may be of the E1 or T1 class, or a packet network as shown in FIG. 7, by way of physical layer interface 55 and network interface adapter 56. Physical layer interface 55 and network interface adapter 56 are conventional subsystems, selected according to the type of network and corresponding interface desired for base station BST1.

Baseband device 40 performs the digital signal processing functions in handling the wireless communications at base station BST1, where such functions include among many others the function of creating and embedding the midambles into frame time slots according the preferred embodiment as further discussed below. To perform these functions, it is contemplated that baseband device 40 will be a subsystem including one or more high-performance digital signal processor (DSP) devices, such as those of the TMS320c5x and TMS320c6x class of DSPs available from Texas Instruments Incorporated, along with the appropriate memory and external functions suitable for handling the digital processing requirements of base station BST1. For FIG. 7, the implementation of baseband device 40 is described according to its various functions, rather than by way of its construction, it being contemplated that those skilled in the art will be readily able to realize baseband device 40 using such conventional integrated circuits from this functional description, and according to the capacity desired for base station BST1.

On the transmit side, baseband device 40 includes encode and modulate function 54, which is coupled between physical layer interface 55 and baseband interface 45, as shown in FIG. 7. Encode and modulate function 54 receives digital data from physical layer interface 55, and performs the appropriate digital processing functions for the particular protocol. For example, encode and modulate function 54 may first encode the received digital data into symbols. As another example, encode and modulate function 54 may then locate the symbols into frame time slots, with each time slot having a midamble inserted between data symbols as shown earlier in FIG. 3. All symbols are then spread, by way of a spreading code, into a sequence of chips, according to a selected chip rate; the spreading also may include the spreading of the symbols into multiple subchannels. Typically, a cell-specific scrambling code is then applied to the spread symbols, so that a receiving wireless unit can distinguish transmissions generated by this base station BST1, from those of neighboring cells. Modulation of the spread symbols is then performed; commonly, the multiple subchannels are split into in-phase (I) and quadrature (Q) groups, so that the eventual modulated signal includes both components. The spread spectrum signal is then applied to baseband interface 45, after the appropriate filtering and pre-equalization for channel distortion, for transmission over antenna AT1 via RF interface function 44 and amplifiers 42.

On the receive side, baseband device 40 receives incoming digital signals from baseband interface 45, after digitization of the received signals within RF interface function 44. These signals are applied to chip-rate demodulation and despreading function 48, which derives the transmitted symbols from the digitized received data. Considering that base station BST1 receives signals over multiple channels, from multiple wireless user stations in its cell, channel estimation function 46 estimates the random channel variation. Channel estimation function 46 and chip-rate demodulation and despreading function 48 each provide output to symbol user detection and combining function 50, in which the demodulated data are associated with their respective channels. In addition, recalling that it is mentioned above that the block diagram of FIG. 7 is readily altered to provide a block diagram of a user station, it is now noted further that such an alteration may be achieved by further including within block 50 a joint detector function. In this case, the joint detector provides a multi-user detection functionality which is preferred for a TDD system because the spreading factor is relatively small (e.g., 16) and so there is considerable interference from other users. Thus, the joint detector operates to cancel out interference from other users. Returning to block 50 in general, after the demodulated data are associated with their respective channels, symbol decode function 52 decodes the received symbols, for each channel and thus each conversation, into a bit stream suitable for communication to the network via physical layer interface 55 and network interface function 56.

Figure 8:
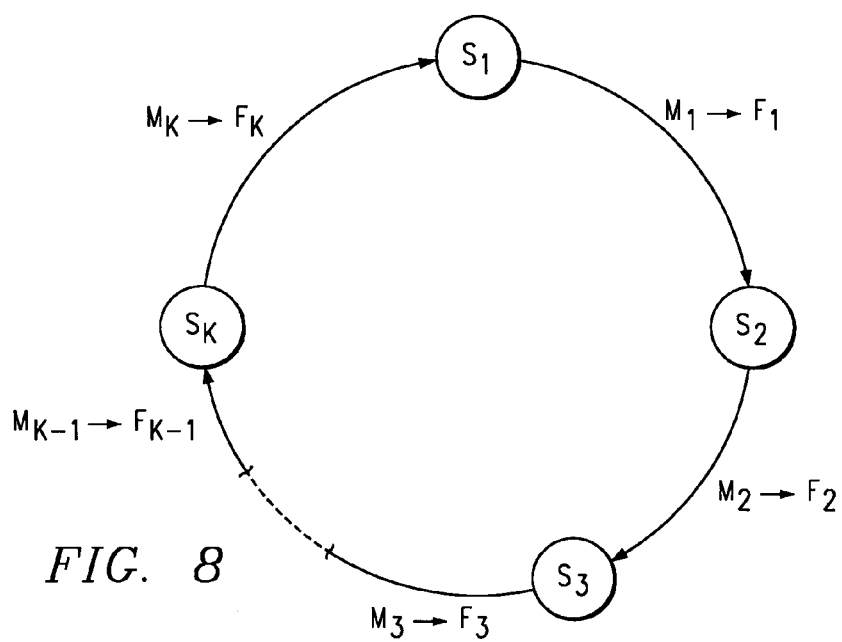
FIG. 8 illustrates a state diagram of a method for cycling midambles in cell transmissions according to the preferred embodiment.
Figure 9A:
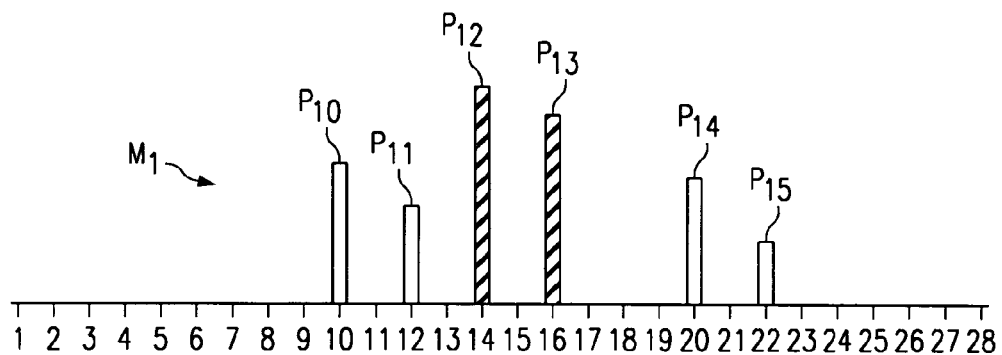
FIGS. 9a through 9d illustrate an example of a receiver's channel estimates by cycling over a sequence of four midambles.
Figure 9B:
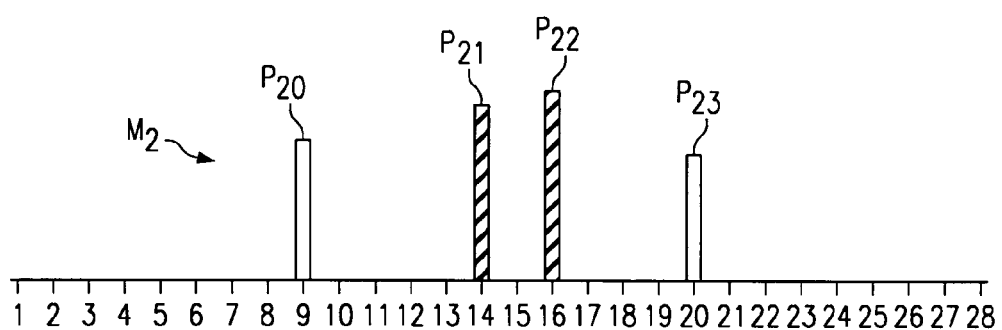
Figure 9C:
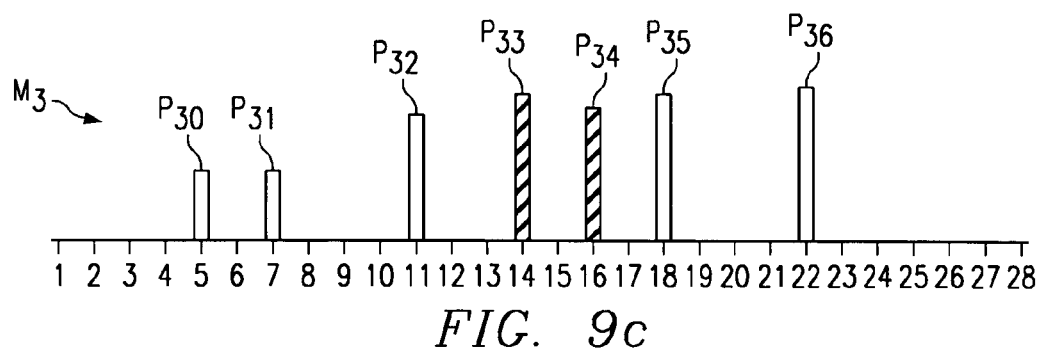
Figure 9D:
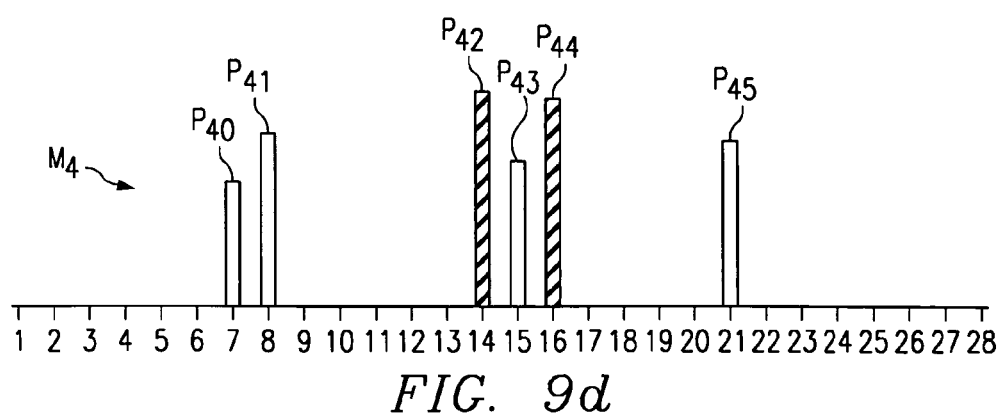

FIG. 8 illustrates a state diagram of a preferred embodiment method for operating a transmitter (i.e., either in a base station BST1 or BST2 or user station UST) to cycle the midambles it includes in its transmissions. For the sake of focusing on a preferred aspect, the state diagram of FIG. 8 is directed only to the insertion of midambles into frames (i.e., time slots thereof) by a transmitter, where such operations may occur via encode and modulate function 54 of FIG. 7; however, one skilled in the art should appreciate that the transmitter (and its associated receiving circuitry) is also concurrently performing numerous other functions not illustrated with respect to FIG. 8. Looking to the state diagram, the transmitter begins its operation in a first state $S_1$. Next, the operation transitions from state $S_1$ to state $S_2$, and this transition represents the formation of a first frame $F_1$ to be transmitted by the transmitter. Specifically, for each time slot in this first frame $F_1$, a first midamble $M_1$ is inserted into the time slot for first frame $F_1$ (shown in FIG. 8 as $M_1 \rightarrow F_1$). Next, the operation transitions from state $S_2$ to state $S_3$, and this transition represents the formation of a second frame $F_2$ to be transmitted by the transmitter. For each time slot in this second frame $F_2$, a second midamble $M_2$ is inserted into the time slot for second frame $F_2$ (i.e., $M_2 \rightarrow F_2$). Further, the operations just described through state $S_3$ repeat for each additional state transition in FIG. 8, whereby a final state $S_K$ is shown representing the formation of a frame $F_K$ where for that frame the transmitter inserts a midamble $M_K$ into each time slot for that frame $F_K$.

Having described a first sequence of the states of FIG. 8, attention is now directed to the next (and further successive) sequences of those states. First, after state $S_K$ is reached and frame $F_K$ is transmitted with midamble $M_K$, it may be appreciated that the midambles corresponding to frames $F_1$ through $F_K$ have cycled through a respective sequence of midambles $M_1$ through $M_K$. Following the transmission of frame $F_K$ and its midamble $M_K$, the flow of FIG. 8 returns to state $S_1$. Thus, the next frame to be transmitted by the transmitter may be represented as $F_{K+1}$. For this frame, the cyclic sequence of midambles $M_1$ through $M_K$ is repeated, starting therefore with the first midamble in that sequence, $M_1$; thus, $M_1$ is now inserted by the transmitter into frame $F_{K+1}$. As each additional frame is created, then each additional state is encountered so that the cycling through the midamble sequence continues, whereby midamble $M_2$ is inserted into frame $F_{K+2}$ midamble $M_3$ is inserted into frame $F_{K+3}$, and so forth until midamble $M_K$ is inserted into frame $F_{2K}$. Finally, the state diagram of FIG. 8 may repeat numerous times, where each repetition of all states corresponds to a complete cycling through the midamble sequence for the base station.

From the preceding, one skilled in the art should now appreciate that in the preferred embodiment a transmitter does not transmit only a single assigned midamble corresponding to the cell in which it is located as is the case in the prior art. Instead, in the preferred embodiment a cell is assigned a sequence of K midambles, and then a transmitter communicating within that cell cycles through these midambles one at a time. In the preferred embodiment, the cycling is such that a different midamble is used for each successive frame transmitted by the transmitter until all midambles in the cycle have been transmitted. Given this operation, various additional observations may be made in connection with particular implementations. As a first observation, the value of K in FIG. 8 may be selected by one skilled in the art according to various considerations. For example, during the development of the preferred embodiment, a value of K on the order of 18 was explored, thereby providing a cyclic sequence of midambles having a total of 18 different midambles. More recently and as further detailed below, it has been observed as a preferred embodiment that operational improvements may be achieved over the prior art with K equal to a lesser number than 18, and indeed considerable benefit may be achieved with K equal to two or four. As a second observation, the mechanism for implementing the sequencing operation and its repetition may be selected by one skilled in the art. In one preferred embodiment approach, note that base station communications in a TDD system are synchronized to the extent that each frame includes a system frame number. Accordingly, the tracking of the change to each different midamble in the cyclic sequence of midambles may be associated with a change in the system frame number. For example, in a preferred embodiment where the cyclic sequence includes two different midambles (i.e., K=2), then a first midamble may be inserted into a frame and transmitted by a transmitter when the base station's system frame number is odd while a second midamble may be inserted into a frame and transmitted by a transmitter when the base station's system frame number is even. As another example, in a preferred embodiment where the cyclic sequence has more than two different midambles (i.e., K>2), then a modulo counter may be triggered by each increment in the base station's system frame number where each change in the counter causes a different and next successive one of the midambles in the cyclic sequence to be inserted into a frame and transmitted by a transmitter. Still other examples are ascertainable by one skilled in the art.

Having described the transmission through a cycle of midambles for a cell according to the preferred embodiment, one skilled in the art should readily appreciate that comparable operations are to be performed by a receiver within a given cell as is now briefly explored. Generally, the receiver operation parallels that of the state diagram of FIG. 8, where for each successive state transition the receiver measures channel estimates in response to the midamble for the current state. For example, since midamble $M_1$ is transmitted in frame $F_1$ and is selected from a cycle of midambles in response to the system frame number, then when that frame $F_1$ is received then the receiver uses the same system frame number to use the same midamble $M_1$ to measures channel estimates, that is, to evaluate the correlation between midamble $M_1$ and the midambles in the received paths. Similarly, therefore, this cycling operation at the receiver continues for successive frames, again as reflected by the system frame number. Thus, when the next frame, $F_2$, is received by the receiver, it uses the system frame number to indicate to it that it is to use midamble $M_2$ to measure channel estimates. This process, therefore, continues in a circular fashion up to using midamble $M_K$ for measuring channel estimates with respect to frame $F_K$, after which the process repeats with midamble $M_1$ and so forth.

To further demonstrate the operation of a receiver in accordance with the preferred embodiment, FIGS. 9a through 9d depict an example of successive frames received for a system using a cycle of four midambles $M_1$ through $M_4$ (i.e., K=4), respectively. The general format of FIGS. 9a through 9d is comparable to FIG. 5 in that each Figure illustrates a conceptual drawing of a number of paths detected by a receiver at the chip positions depicted, where it now be further understood with respect to the present Figures that they illustrate paths identified by the receiver performing channel estimates using the cycle of four midambles $M_1$ through $M_4$. Thus, for FIG. 9a, the receiver determines channel estimates using midamble $M_1$ and, in response, it identifies six paths $P_{10}$ through $P_{15}$. Similarly, for FIG. 9b, the receiver determines channel estimates using midamble $M_2$ and, in response, it identifies four paths $P_{20}$ through $P_{23}$. Similar observations may be made with respect to FIG. 9c where paths $P_{30}$ through $P_{36}$ are identified in response to a channel estimate based on midamble $M_3$ and with respect to FIG. 9d where paths $P_{40}$ through $P_{45}$ are identified in response to a channel estimate based on midamble $M_4$.

Examining now FIGS. 9a through 9d as a whole, the results of the preferred embodiment of cycling midambles for signal transmission and receipt may be appreciated. More particularly, a receiver performing DPE in the preferred embodiment does so by evaluating channel estimates over successive frames using the different midambles in the cycle as described above, and then the receiver further enhances that process by identifying as actual paths those paths that appear at the same bit position for those successive frames. In other words, for each individual FIGS. 9a through 9d and according to the prior art, only the relative magnitude of each path provides a basis from which to attempt to distinguish an actual path from a false path. However, because the preferred embodiment uses a different midamble for successive frames, then only those paths that appear in the same bit positions over those successive frames are likely to be actual paths. To further appreciate this aspect, note in contrast that if the same midamble were used as in the prior art, then one skilled in the art would anticipate paths to exist at different positions as between FIGS. 9a and 9b due to the cross-correlations from one or more other midambles. However, because cycled midambles are used in the preferred embodiment, then it is much more likely that paths at the same bit position over successive frames are likely to be from strong autocorrelations for each different midamble in the cycle and, hence, such like-positioned paths are likely to reflect an actual path rather than a false path. By way of a specific example, comparing FIG. 9a to FIG. 9b, it may be seen that three paths occur at like chip positions, namely, paths $P_{12}$ and $P_{21}$ occur at position 14, paths $P_{13}$ and $P_{22}$ occur at position 16, and paths $P_{14}$ and $P_{23}$ occur at position 20. Various circuits may be used to identify these like-positioned paths, such as through use of a matched filter. In any event, with only the two midambles of FIGS. 9a and 9b, it could be predicted that each of the three paths having common bit positions are actual paths, while the remaining paths are false paths. However, by adding FIG. 9c and its midamble $M_3$ to the analysis, it may be seen that no path is identified at position 20, while there are still two paths (i.e., paths $P_{33}$ and $P_{34}$) at position 14 and 16 for which there were paths for midambles $M_1$ and $M_2$ in FIGS. 9a and 9b, respectively. Indeed, finally looking to FIG. 9d, once again it is seen that paths exist at positions 14 and 16 (i.e., paths $P_{42}$ and $P_{44}$). Accordingly, in the preferred embodiment the DPE of the receiver is aided by giving additional consideration to those paths at like positions and, thus, it may be concluded by the receiver after cycling through midambles $M_1$ through $M_4$ that the paths at positions 14 and 16 are actual paths (and, thus, are shaded by way of the convention of FIG. 5), while the remaining paths indicated in FIGS. 9a through 9d are false paths (and, thus, are not shaded by way of the convention of FIG. 5).

Figure 10:
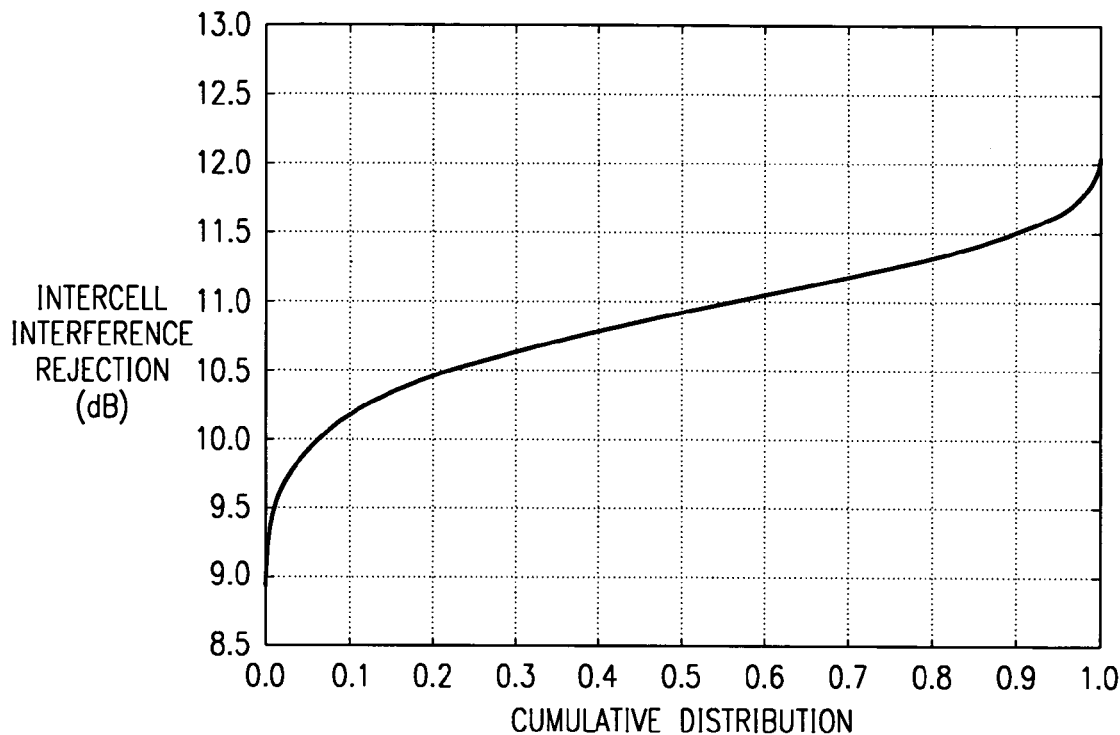
FIG. 10 illustrates a plot of the cumulative distribution of intercell rejection in response to cycling midambles according to the preferred embodiment.

FIG. 10 illustrates a plot of the cumulative distribution of intercell rejection in response to cycling midambles according to the preferred embodiment. More particularly, FIG. 10 illustrates the intercell rejection for an example where K=18, that is, the midambles are cycled in frame transmissions over a sequence of 18 different sequences before returning again to repeat that sequence. The plot of FIG. 10 therefore may be contrasted to the prior art plot of FIG. 6. In FIG. 10, the minimum intercell rejection is 9 dB and the median rejection is 11 dB. Thus, in general the intercell rejection is greater than that in the prior art and, therefore, there is a greater tendency to reject false paths. As a result, this allows the DPE to more accurately determine actual paths, with the improved detection of those paths thereby improving additional receiver operations.

Figure 11:
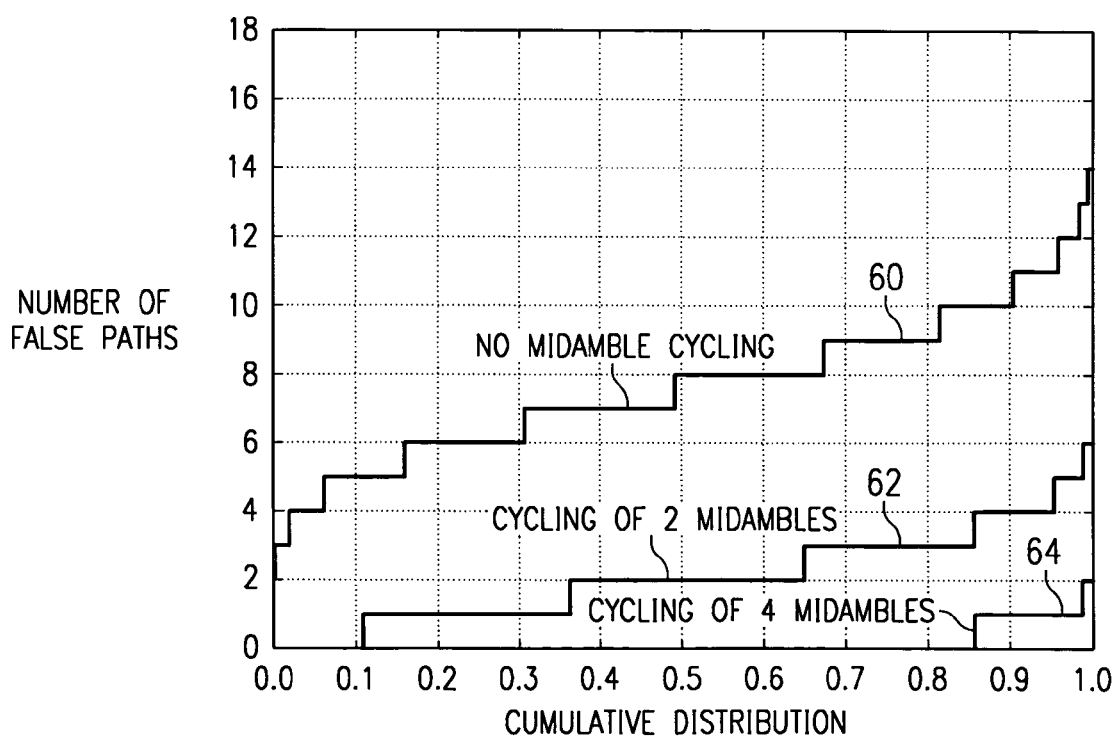
FIG. 11 presents an additional illustration contrasting the results of actual versus false path detection between the prior art and the preferred embodiments.

FIG. 11 presents an additional illustration contrasting the results between the prior art and the preferred embodiments as relating to actual versus false path detection. Specifically, FIG. 11 illustrates a cumulative distribution of midambles, and for that distribution FIG. 11 presents a plot 60 corresponding to the case of no midamble cycling, as well as a plot 62 corresponding to the case of cycling between two different midambles and a plot 64 corresponding to the case of cycling between four different midambles. The vertical axis in FIG. 11 indicates the number of false paths having a value of greater than −10 dB, that is, paths below −10 dB are disregarded. Plot 60 demonstrates that if no midamble cycling is performed, then 50 percent of the time there are eight or more false paths that are −10 dB or stronger. In contrast, plot 62 demonstrates that if midamble cycling is performed per FIG. 8 and using only two midambles (i.e., K=2), then far fewer number of false paths occur as compared to plot 60. Still further, plot 64 demonstrates that if midamble cycling is performed per FIG. 8 and using four midambles (i.e., K=4), then more than 85 percent of the time there are no false paths detected.

From the above, it may be appreciated that the above embodiments provide a transmitter for use in a wireless system and for cycling midambles to improve intercell rejection. Further, while the present embodiments have been described in detail, various substitutions, modifications or alterations could be made to the descriptions set forth above without departing from the inventive scope. Indeed, various different embodiments have been described which assist in developing this inventive scope. In addition, still other changes may be made to the inventive teachings. For example, the transmitter of FIG. 7 is only one of many transmitter embodiments which may cycle midambles according to the teachings of this document. As another example, while midambles have been shown to be cycled on a per frame basis, in an alternative embodiment they may be cycled according to some other grouping of data (e.g., per time slot, per multiple frames). As another example, while the preferred embodiment has been described in the context of a TDD CDMA implementation, other wireless systems such as time division multiple access ("TDMA") also may benefit from the present teachings. As yet another example, while a midamble has been shown as a preferred group of bits that may be cycled, other sets of bits that are unique to a cell may well be identified by one skilled in the art as having undesirable cross correlations so that as an improvement the bit sets may be cycled through a sequence of two or more alternative bit sets so as to reduce the cross correlations and any negative results arising from those cross correlations. From the above, therefore, one skilled in the art should further appreciate the inventive scope as defined by the following claims.

The invention claimed is:

1. A wireless communication system, comprising:
   transmitter circuitry comprising circuitry for transmitting a plurality of frames to a receiver in a first cell;
   wherein each of the plurality of frames comprises a bit group;
   wherein the transmitter circuitry further comprises circuitry for inserting a bit sequence into the bit group;
   wherein the bit sequence is selected from a plurality of bit sequences such that successive transmissions by the transmitter circuitry comprise a cycle of successive ones of the plurality of bit sequences;
   wherein each of the plurality of frames comprises a midamble;
   wherein the midamble comprises the bit group;
   wherein the plurality of bit sequences consists of two bit sequences;
   wherein each of the plurality of frames has a corresponding system frame number;
   wherein the bit sequence is selected from the plurality of bit sequences in response to the system frame number; and
   wherein the bit sequence is selected from the plurality of bit sequences in response to whether the system frame number is odd or even.

2. A wireless communication system, comprising:
   transmitter circuitry comprising circuitry for transmitting a plurality of frames to a receiver in a first cell;
   wherein each of the plurality of frames comprises a bit group;
   wherein the transmitter circuitry further comprises circuitry for inserting a bit sequence into the bit group;
   wherein the bit sequence is selected from a plurality of bit sequences such that successive transmissions by the transmitter circuitry comprise a cycle of successive ones of the plurality of bit sequences;
   wherein the plurality of bit sequences consists of two bit sequences;
   wherein each of the plurality of frames has a corresponding system frame number;
   wherein the bit sequence is selected from the plurality of bit sequences in response to the system frame number; and
   wherein the bit sequence is selected from the plurality of bit sequences in response to whether the system frame number is odd or even.

3. The system of claim 2:
   wherein each of the plurality of frames comprises a midamble;
   wherein the midamble comprises the bit group;
   wherein the plurality of bit sequences consists of two bit sequences; and
   wherein the transmitter circuitry comprises CDMA transmitter circuitry.

4. The system of claim 2:
   wherein each of the plurality of frames has a corresponding system frame number; and
   wherein each bit sequence is selected from the plurality of bit sequences in response to the system frame number.

5. The system of claim 2 wherein the transmitter circuitry comprises CDMA transmitter circuitry.

6. The system of claim 2 wherein the transmitter circuitry comprises TDMA transmitter circuitry.

7. The system of claim 2 and further comprising the receiver, wherein the receiver comprises:
   circuitry for receiving the plurality of frames; and
   circuitry for identifying paths in the plurality of frames as actual paths in response to a comparison of path positions resulting from successive correlation measures between successive ones of the plurality of bit sequences in the cycle and the bit group in each of the plurality of frames.

8. The system of claim 7 wherein the circuitry for identifying paths in the plurality of frames as actual paths identifies paths as actual paths in response to paths in the plurality of frames have a like chip position.

9. A method of operating a wireless communication system, comprising the steps of:
- transmitting a plurality of frames by transmitter circuitry to a receiver in a first cell;
- wherein each of the plurality of frames comprises a bit group;
- wherein the bit group uniquely distinguishes the first cell from a second cell adjacent the first cell;
- wherein the transmitting step comprises inserting a bit sequence into the bit group;
- wherein the bit sequence is selected from a plurality of bit sequences such that successive transmissions by the transmitter circuitry comprise a cycle of successive ones of the plurality of bit sequences;
- wherein each of the plurality of frames comprises a midamble;
- wherein the midamble comprises the bit group;
- wherein the plurality of bit sequences consists of two bit sequences;
- wherein each of the plurality of frames has a corresponding system frame number;
- wherein the bit sequence is selected from the plurality of bit sequences in response to the system frame number; and
- wherein the bit sequence is selected from the plurality of bit sequences in response to whether the system frame number is odd or even.

10. The method of claim 9 wherein the transmitter circuitry comprises CDMA transmitter circuitry.

11. The method of claim 9 wherein the transmitter circuitry comprises TDMA transmitter circuitry.

12. The method of claim 9 and further comprising the steps of:
- receiving the plurality of frames at a receiver station in the first cell; and
- identifying paths in the plurality of frames as actual paths in response to a comparison of path positions resulting from successive correlation measures between successive ones of the plurality of bit sequences in the cycle and the bit group in each of the plurality of frames.

13. The method of claim 12 and further comprising applying channel estimates corresponding to the actual paths to a maximal ratio combiner circuit.

* * * * *